Computer of Average Response Transients (Multiple Channel Digital Computer 19)

INVENTOR.
Manfred E. Clynes
BY
ATTORNEYS

United States Patent Office 3,087,487
Patented Apr. 30, 1963

3,087,487
COMPUTER OF AVERAGE RESPONSE TRANSIENTS
Manfred E. Clynes, Orangeburg, N.Y., assignor, by mesne assignments, to Mnemotron Corporation, a corporation of New York
Filed Mar. 17, 1961, Ser. No. 96,497
8 Claims. (Cl. 128—2.1)

This invention relates generally to techniques and apparatus for measuring electrical signals embedded in noise, and more particularly to a biological response computer.

There are many situations in which significant signal data are contained within an electrical input having a background of noise or irrelevant electrical activity. Where the signal-to-noise ratio is unfavorable or is such that the signal cannot readily be differentiated from noise even by visual inspection, precise signal measurements cannot be made. The noise component may originate in the electrical system or the noise may arise at the point of signal origin.

This problem is particularly acute in brain wave analysis or electro-encephalography, and while the present invention will be described in this specific context, it is to be understood that the techniques underlying the invention are also useful in many other biological applications, such as cardiograms and retinograms as well as in non-biological applications as in the analysis of radar signals reflected from distant targets. In the case of very weak radar echo pulses, it is extremely difficult to distinguish these signals from the random noise received and developed in the system.

In recording electrical brain activity from human subjects, the electrical potentials of the brain are available only in highly attenuated form, for the recordings are made from the scalp through the skull. Direct recordings of brain activity are secured primarily in experimental animals using implanted electrodes. With human subjects it is not usually feasible to implant electrodes.

The human brain potentials recorded are very small, being in the order of microvolts. In the past, attention has been focused on recurrent waves in brain activity, such as alpha rhythms having a pulse frequency of 8 to 13 per second which are customarily found in a normal human adult when he is relaxed and has his eyes closed. Relatively slow delta rhythms of ½ to 3 per second are encountered when the subject is asleep, whereas beta rhythms of 13 to 30 cycles per second are found when the subject is aroused and anxious.

Various transients are encountered in brain activities when stimuli are applied to the subject. Heretofore these transients have been very difficult to distinguish from the total electrical brain activity as detected from the scalp by standard encephalographic methods or even as detected with implanted gross electrodes. For example, the electrical response of the brain to a faint flash or light, a sound click, a touch sensation or even an internal event, such as respiration, has been almost impossible to pick up. The individual responses to these stimuli are virtually invisible within the total brain activity.

Accordingly, it is the main object of this invention to provide a technique and apparatus for precisely measuring electrical signals embedded in noise.

More particularly, it is an object of the invention to provide a multiple channel computer arrangement in which each time a stimulus occurs, the resultant electrical input containing the signal response is converted into a series of spaced ordinates each of which is represented by a pulse count proportional to the instantaneous amplitude of the input, each count being stored in a separate channel of the computer and being accumulated therein with successive stimuli to provide a series of sums which when displayed permit measurement of the signal as against the noise component in said input.

A significant advantage of the invention is that it makes "on-line" analysis possible, that is to say, as the data occurs it is simultaneously analyzed.

Also an object of the invention is to provide an instrument of the above-described type which is of efficient and reliable design, which may be made in compact form using transistor circuits and which may be manufactured and sold at relatively low cost for widespread laboratory use.

When measuring the transient response of the brain to given stimuli, in the technique in accordance with the invention, a considerable number of these responses is obtained. As the responses are summated, the associated noise is diminished relative to the sum of the responses by a factor which is the square root of the number of responses summed. Stated mathematically, the signal-to-noise ratio improves by a factor of $\sqrt{n}$, when "$n$" is the number of responses. Inasmuch as the time position of the signal within the input, with repeated stimuli, remains substantially constant, whereas the noise positions are random, it will be obvious that the greater number of responses summated, the more evident the signal will become relative to the background.

In accordance with the invention, a computer system is used wherein the response signal and accompanying noise in the electrical input are converted into digital form. The function of the computer is continuously to measure and add the responses as they occur and provide a sum of all of the responses. As the repetitive responses accumulate, the response, which in an individual record is buried in ongoing activity of the brain or noise, is rendered visible. Thus the computer enables observation of electrical activities of the human brain which were not previously visible.

For a better understanding of the invention, as well as other objects and features thereof, reference is made to the following detailed description to be read in conjunction with the accompanying drawings, wherein.

Figure 1:
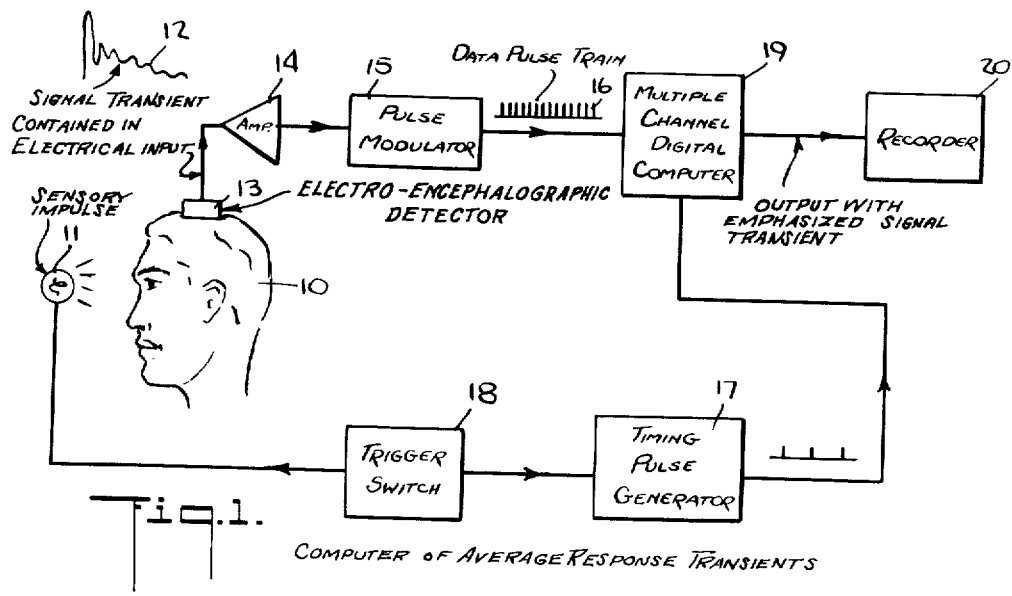
FIG. 1 is a block diagram of a preferred embodiment of the system in accordance with the invention.

Referring now to the drawings, and more particularly to FIG. 1, the invention will be illustrated as it operates to measure the electrical response in the brain of a human subject 10 to a flash of light produced by a flash lamp 11. The brain activity including the response to this stimulus, represented by waveform 12, is picked up by a standard electro-encephalographic detector 13 applied to the skull of the subject. As pointed out previously, the invention is by no means limited to measuring brain activity and may be applied to any situation in which it is difficult to discriminate between a significant signal and a heavy background of noise.

The signal output of detector 13 is fed through an amplifier 14 of any suitable design to a pulse-frequency modulator 15 adapted to generate pulses having a repetition rate which is proportional to the varying amplitude of the signal. In a practical embodiment of the invention, the modulator may have a carrier repetition rate of 100 kilocycles per second, the rate being varied as a function of the signal. A suitable modulator for this purpose is disclosed in applicant's copending applications Ser. No. 829,694, filed July 27, 1959 and Ser. No. 72,171, filed November 25, 1960, the modulator being comprised of an astable asymmetrical multivibrator generating carrier pulses, the applied modulation voltage causing the pulse rate to vary about the carrier frequency.

Thus the output of modulator 15 consists of frequency modulated pulses, represented by pulse train 16, of identical shape and size. The repetition rate at any instant depends on the instantaneous amplitude of the electrical input derived from brain activity. This train of pulses is referred to hereinafter as the data pulse train.

A second train of pulses is provided, which second train is produced by a constant pulse frequency generator 17 whose operating frequency may be selectively adjusted. The second train of pulses is of considerably lower frequency than the data train and is called the clocking or timing pulse train. The second train may be a continuous pulse train, or it may be an intermittent series, in which event it will have a predetermined number of pulses, such as 400, and thereupon pause for a given interval, after which another series of 400 pulses will be produced, to be again followed by another silent interval and so on. While 400 is chosen by way of example, it is to be understood that generator 17 is adjustable and other rates may be selected.

The timing pulse train is so synchronized with the light stimulus that where the pulse train is continuous the stimulus occurs every 400 pulses. This can be done by means of a counter coupled to the generator and arranged to activate the flash lamp every 400 pulses, or whatever timing number is chosen.

Alternatively, the stimulus may be used to initiate the intermittently generated timing pulse train so that upon the occurrence of a stimulus a series of 400 pulses is generated, followed by a silent interval until the next stimulus occurs and so on. This may be accomplished as shown in FIG. 1 by a triggering switch 18 which simultaneously activates the flash lamp 11 and the timing pulse generator. Thus each time the lamp is activated, this initiates a timing pulse train. In accordance with the invention, the stimulus is made to recur for a considerable number of times, so that the wave response is similarly repeated.

The data pulses are fed into a multiple channel digital computer 19 such as Radiation Instrument Development Laboratory Model 34–12 "Channel Analyzer" used in the time mode only, or Radiator Counter Laboratories Inc. Multiple Channel Analyzers, Models RCL 512–256 or RCL iac 128.

The computers are all of similar design and, for purposes of illustration, we shall confine ourself to Model 34–12 which is disclosed more fully in the Operator's Manual, published in July 1960 by Radiation Instrument Development Laboratories, Inc., of Northlake, Illinois.

Figure 2:
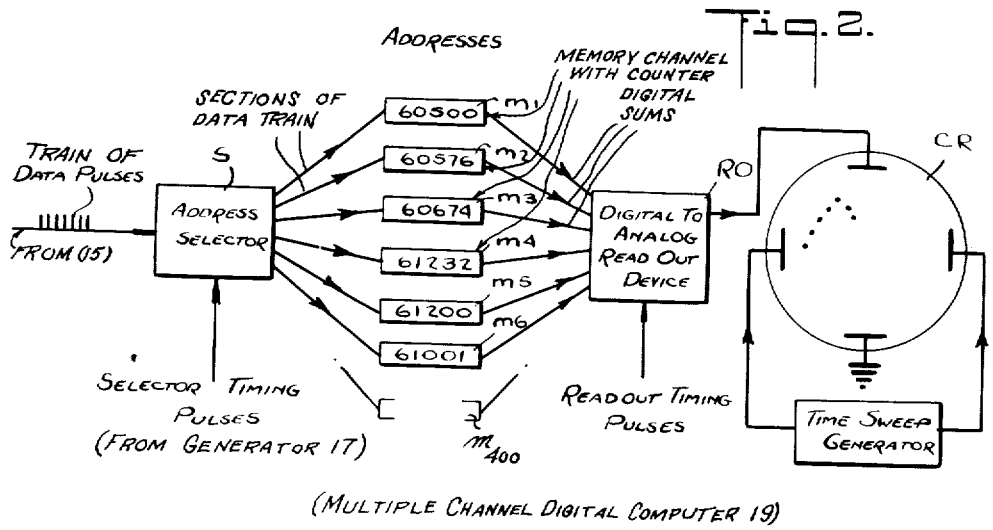
FIG. 2 is a functional diagram of the multiple channel computer incorporated in the system.

As shown functionally in FIG. 2, the multiple channel computer 19 is composed of a large number of memory locations $m_1$, $m_2$, $m_3$, etc., called addresses (only six being shown) and in the case of Model 34–12, which is the example used, 400 such locations are provided. These memory locations appear within a magnetic core memory matrix which acts to store the incoming pulses. Counter or scalar circuits operate in conjunction with the memory locations to add the pulses stored therein. In Model 34–12 each address has a capacity of 100,000 counts and by means of the counter, the counts may be accumulated and summated. The count accumulated is stored in the counter and can be read out at any time through a read-out RO to be later described.

By means of an address selection system S, the incoming pulses are shifted or stepped from one memory address to the next. The selector is controlled by the timing pulses from generator 17 so that each time a timing pulse is applied, the selector directs the incoming data pulses to the next consecutive location.

Let us now consider the operation in connection with a computer having 400 addresses with a timing pulse train of 400 per second, and in which the stimulus is repeated 200 times. When the first stimulus occurs, an electrical input is generated as indicated by form 12 in FIG. 1. This input is converted into a data pulse train 16 whose repetition rate varies as the amplitude of the input. The occurrence of the stimulus also initiates the train of 400 timing pulses which is applied to the selector in the computer, so that first the data pulses are entered into memory $m_1$, later they are fed into the second memory $m_2$ and so on until sequential entries are made in the 400 addresses during the interval of the 400 time impulses. The arrangement may be made such as to interrupt the pulse generator upon occurrence of the 400th pulse (the last address) so that the operation of the generator is again initiated only upon occurrence of the next stimulus.

The number of pulses entered in each address is counted. This process is repeated for the second stimulus, this time the pulses entered into each of the 400 addresses being added to those previously scored therein. After 200 such stimuli, each memory unit holds the sum of 200 responses.

As a result of this operation, the brain activity is effectively cut up into 400 ordinates, one for each time a stimulus occurs. The ordinates are spaced apart in time at the same intervals as appear in the timing pulse train. Each ordinate is represented in the memory by the number of counts in the data pulse train counted during the time interval of that ordinate. Inasmuch as the pulse frequency of the data pulse train is proportional to the instantaneous amplitude of the input, the number of counts accumulated is proportional to the instantaneous amplitude of the brain activity at that time, or more exactly to the average value of the input ordinate during the time interval between two timing pulses.

The counts accumulated and summated in the several memory channels are stored therein and may be read out at any time through read-out device RO. The read-out device is essentially a digital-to-analog conversation device which converts the stored numerical value to a voltage whose magnitude is proportional thereto. The read-out device is controlled by timing pulses to step consecutively from memory channel to memory channel and thereby provide a series of analog voltages each representative of a respective sum.

The read-out values may be displayed on a cathode ray screen C—R by applying the voltages to one set of deflection elements, a timing base or sweep voltage being concurrently applied to the other set of deflection elements to provide a cathode ray display in which the analog values are presented in rectangular coordinates. The display may of course be photographed to provide a record.

Figure 3:
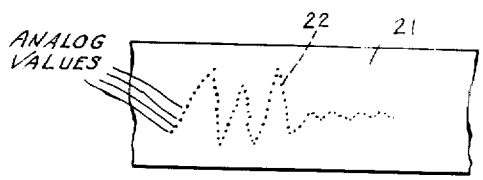
FIG. 3 is an example of the indication produced in recording the output of the system.

A similar display in permanent form may be small by means of a strip chart pen recorder coupled to the read-out device or an X—Y platter, wherein the 400 numbers corresponding to the addresses of the memory are read out in the form of closely spaced points on a graph constituting essentially a continuous line representative of the evoked potentials in the brain or representing the response to the stimulus. Thus, as shown in FIG. 3, the output appearing on the recording paper or strip chart 21 and constituted by a series of four hundred points 22, effectively constitutes a continuous line in which the transient signal is emphasized relative to background noise.

Since the summated responses of the signal accumulate at the same time position within the electrical input, whereas noise tends to be random, by accumulating a great number of responses the signal appearing in the output waveform becomes clearly discernible. As pointed out previously, the utility of the averaging technique (the average is simply obtained by dividing the sum by the number of stimuli) goes far beyond its application in brain analysis. It can be used wherever average responses are required which are masked by noise.

Thus the apparatus in accordance with the invention is adapted to indicate a signal transient contained in an electrical input having a relatively heavy noise component. The apparatus includes means repeatedly to generate the signal transient for a given number of times. Such means in FIG. 1, are constituted by the triggered light source in combination with the brain electrode. However, the nature of these means will depend on the electrical input to be analyzed.

The apparatus further includes means responsive to each transient generation to convert a predetermined interval of the input containing the transient into a train of data pulses having a relatively high repetition rate which varies as the amplitude of the input during this interval. Such means are constituted by the pulse modulator 15 in FIG. 1, which is modulated by the electrical input to produce a data pulse train of varying repetition rate.

The apparatus further includes means to divide the data train into a series of sections of equal duration, the number of pulses in each section depending on the amplitude of the input at the time position corresponding thereto. This is constituted by the selector S in FIG. 2 actuated by the timing pulses to feed the train sequentially into the memory channels.

The apparatus further includes a like series of memory channels. This is constituted in FIG. 2, by the memory channels $m_1$, etc., the pulse sections being entered therein by the selector and being counted and accumulated to provide the digital sums of the pulses.

Finally, the apparatus includes means to read out the sums sequentially from the channels to provide an output in which the signal transient is clearly discernible with respect to the noise component. This is constituted, in FIG. 2, by the digital-to-analog readout device in combination with the cathode ray indicator.

While there have been shown what are considered to be preferred embodiments of the invention, it will be manifest that many changes and modifications may be made therein without departing from the essential spirit of the invention. For example, where the count capacity of the memory channels is limited, it is desirable to subtract from each count entered therein, a fixed number of counts, thereby reducing the accumulated counts to conform to the capacity of the system. It is intended, therefore, in the annexed claims to cover all such changes and modifications as fall within the true scope of the invention.

What is claimed is:

1. The method of indicating a signal transient contained in an electrical input having a relatively large noise component, comprising the steps of repeatedly generating said signal transient for a given number of times, converting in response to each generation a predetermined interval of said input into a train of data pulses whose repetition rate varies as the amplitude of said input during said interval, directing said data pulse train successively into a series of memory channels to divide said train into pulse sections of equal duration, each section entering a respective channel, the number of pulses in each section being representative of the amplitude of said input at the time position corresponding thereto, counting and accumulating the pulses entered in each memory channel to provide the digital sums thereof, and reading out said sums in said channels sequentially to provide an output in which the signal transient is clearly discernible with respect to the noise component.

2. The method as set forth in claim 1, wherein said signal transient is produced by the electrical response of a living subject to a sensory stimulus, and said train of data pulses is initiated by said stimulus.

3. The method of indicating a signal transient contained in an electrical input having a relatively heavy noise component, comprising the steps of repeatedly generating said signal transient for a given number of times, converting in response to each generation, a predetermined interval of said electrical input into a succession of pulse combinations each of which is respectively representative of the amplitude values of said input at a series of equi-spaced time positions in said interval, counting and accumulating the pulse combinations representing the respective values in a like series of memory channels to provide the sums resulting from said repeated generations, and reading out the sums sequentially to provide an output in which the signal transient is clearly discernible with respect to the noise component.

4. The method as set forth in claim 3, wherein said pulse combinations are digital in form and are counted arithmetically.

5. Apparatus for indicating a signal transient contained in an electrical input having a relatively heavy noise component, comprising means repeatedly to generate said signal transient for a given number of times, means responsive to each generation to convert a predetermined interval of said input containing the transient into a train of data pulses having a relatively high repetition rate which varies in accordance with the amplitude of said input during said interval, means to divide said train into a series of sections of equal duration, the number of pulses in each section depending on the amplitude of said input at the time position corresponding thereto, a like series of memory channels, means to enter said pulse sections respectively into said channels to count and accumulate the pulses to provide the digital sums thereof, and means to read out said sums in said channels sequentially to provide an output in which the signal transient is clearly discernible with respect to the noise component.

6. Apparatus as set forth in claim 5, wherein said read-out means includes a device to convert said digital sums to analog values.

7. Apparatus for measuring a signal transient contained in an electrical input having a relatively heavy noise component, said apparatus comprising means repeatedly to generate said signal transient a given number of times, a frequency-modulated pulse generator responsive to each of said generations to produce for a predetermined interval a train of data pulses having a relatively high carrier frequency, the repetitive rate of said pulses varying in accordance with the amplitude of said input during said interval, a computer including a multiplicity of channels for storing incoming pulses and for counting the number thereof, an input selector for entering incoming pulses sequentially into said channels and a read-out device for sequentially deriving the count from each channel and converting it into an analog value, a relatively low-frequency timing periodic pulse generator coupled to said selector to cause it to step sequentially from channel to channel, means coupling said frequency-modulated pulse generator to said computer whereby said train of data pulses is fed by said selector sequentially into said channels, a section of the train being fed into each channel, whereby as said signal transient is repeatedly generated said computer channels accumulate and count the data pulses entered therein, and an indicator means coupled to said read-out device to produce an output in which said signal transient is distinguishable from said noise component.

8. Apparatus for measuring a signal transient contained in an electrical input having a relatively heavy noise component, said apparatus comprising a stimulus-producing member to generate a signal transient in a living subject, a frequency-modulated pulse generator responsive to said transient to produce for a predetermined interval a train of data pulses whose repetition rate varies in accordance with the amplitude of said input during said interval, a computer including a multiplicity of memory channels for storing incoming pulses and for counting the number thereof to produce a sum, an input selector for entering incoming pulses sequentially into said channels and a read-out device for sequentially deriving the sum from each channel and converting it into an analog value, a timing pulse generator coupled to said selector to cause it to step sequentially from channel to channel, means coupling said frequency-modulated pulse generator to said computer whereby said train of data pulses is fed sequentially into said channels, a section of the data pulse train being fed into each channel, means simultaneously activating said stimulus-producing and said timing pulse generator repetitively whereby said signal transient is regenerated and said computer channels accumulate the data pulses entered therein in successive generations, and indicator means coupled to said read-out device to produce an output in which said signal transient is distinguishable from said noise component.

References Cited in the file of this patent
UNITED STATES PATENTS

| | | |
|---|---|---|
| 2,465,355 | Cook | Mar. 29, 1949 |
| 2,478,920 | Hansell | Aug. 16, 1949 |
| 2,564,014 | Lanuza | Aug. 14, 1951 |
| 2,648,822 | Walter | Aug. 11, 1953 |
| 2,680,194 | Young | June 1, 1954 |
| 2,860,627 | Harden | Nov. 18, 1958 |
| 2,865,564 | Kaiser | Dec. 23, 1958 |
| 2,891,153 | Walker | June 16, 1959 |
| 2,892,940 | Ogletree | June 30, 1959 |
| 2,918,054 | Goolkasian | Dec. 22, 1959 |
| 2,933,364 | Campbell | Apr. 19, 1960 |
| 2,950,463 | Brunn | Aug. 23, 1960 |
| 2,982,853 | Price | May 2, 1961 |
| 3,011,160 | Gratian | Nov. 28, 1961 |
| 3,016,490 | Petriw | Jan. 9, 1962 |
| 3,030,946 | Richards | Apr. 24, 1962 |

Disclaimer 3,087,487.—*Manfred E. Clynes*, Orangeburg, N.Y. COMPUTER OF AVERAGE RESPONSE TRANSIENTS. Patent dated Apr. 30, 1963. Disclaimer filed July 7, 1965, by the assignee, *Technical Measurement Corporation*.
 Hereby enters this disclaimer to claims 3 and 4 of said patent.
 [*Official Gazette August 17, 1965.*]